US012756008B2

(12) United States Patent
Kang et al.

(10) Patent No.: US 12,756,008 B2
(45) Date of Patent: Oct. 6, 2026

(54) METHOD FOR MANUFACTURING SECONDARY BATTERY

(71) Applicant: LG Energy Solution, Ltd., Seoul (KR)

(72) Inventors: Yong-Hee Kang, Daejeon (KR); Ji-Hoon Ryu, Daejeon (KR); Yeo-Min Yoon, Daejeon (KR); Jae-Won Lee, Daejeon (KR); Jung-Hoon Lee, Daejeon (KR); Bum-Young Jung, Daejeon (KR)

(73) Assignee: LG Energy Solution, Ltd., Seoul (KR)

(*) Notice: Subject to any disclaimer, the term of this patent is extended or adjusted under 35 U.S.C. 154(b) by 807 days.

(21) Appl. No.: 18/009,661

(22) PCT Filed: Sep. 13, 2021

(86) PCT No.: PCT/KR2021/012447
§ 371 (c)(1),
(2) Date: May 17, 2023

(87) PCT Pub. No.: WO2022/055324
PCT Pub. Date: Mar. 17, 2022

(65) Prior Publication Data
US 2023/0275267 A1 Aug. 31, 2023

(30) Foreign Application Priority Data
Sep. 14, 2020 (KR) ........................ 10-2020-0117965

(51) Int. Cl.
*H01M 10/0565* (2010.01)

(52) U.S. Cl.
CPC .................. *H01M 10/0565* (2013.01); *H01M 2300/0085* (2013.01)

(58) Field of Classification Search
CPC .................. H01M 10/0565; H01M 2300/0085
(Continued)

(56) References Cited

U.S. PATENT DOCUMENTS

2009/0202918 A1 8/2009 Uchida et al.
2012/0321962 A1 12/2012 Kajita et al.
(Continued)

FOREIGN PATENT DOCUMENTS

GB 2526312 B 10/2018
JP 2001-351682 A 12/2001
(Continued)

OTHER PUBLICATIONS

English translation of Written Opinion for PCT/KR2021/012447. (Year: 2022).*

*Primary Examiner* — Patricia L. Hailey
(74) *Attorney, Agent, or Firm* — Bryan Cave Leighton Paisner LLP

(57) ABSTRACT

A method for manufacturing a gel polymer electrolyte battery, the method comprising two steps of pressurization carried out before and after a formation step, is provided. The method provides a gel polymer electrolyte battery having a small gap between a separator and an electrode, high binding force, reduced thickness, improved shape stability and stiffness, and thus provides the gel polymer electrolyte battery having increased initial capacity, reduced initial resistance, and improved characteristics, such as cycle characteristics, high-temperature safety, overcharge safety and penetration safety.

11 Claims, 2 Drawing Sheets

(58) Field of Classification Search
USPC .................................. 429/300–303; 252/62.2
See application file for complete search history.

(56) References Cited

U.S. PATENT DOCUMENTS

| | | | | |
|---|---|---|---|---|
| 2016/0359197 | A1* | 12/2016 | Watarai ............. | H01M 10/0568 |
| 2017/0324115 | A1 | 11/2017 | Kaneko et al. | |
| 2019/0165359 | A1 | 5/2019 | Sugihara et al. | |
| 2020/0044233 | A1 | 2/2020 | Choi et al. | |
| 2020/0365933 | A1* | 11/2020 | Shin .................... | H01M 10/058 |
| 2021/0135304 | A1 | 5/2021 | Lee et al. | |
| 2023/0178801 | A1* | 6/2023 | Lee ..................... | H01M 10/281<br>429/303 |

FOREIGN PATENT DOCUMENTS

| | | | | | |
|---|---|---|---|---|---|
| JP | 2004079310 | A | * | 3/2004 | ............ H01M 10/05 |
| JP | 2006-179235 | A | | 7/2007 | |
| JP | 2008-84838 | A | | 4/2008 | |
| JP | 2008-97940 | A | | 4/2008 | |
| JP | 2015065065 | A | | 4/2015 | |
| KR | 10-0558844 | B | | 3/2006 | |
| KR | 10-1106359 | B1 | | 1/2012 | |
| KR | 10-2015-0031018 | A | | 3/2015 | |
| KR | 10-2017-0003614 | A | | 1/2017 | |
| KR | 10-2019-0012843 | A | | 2/2019 | |
| KR | 10-2019-0062280 | A | | 6/2019 | |
| KR | 10-2019-0064285 | A | | 6/2019 | |
| KR | 2019062280 | A | * | 6/2019 | .......... H01M 10/052 |
| KR | 10-2020-0084510 | A | | 7/2020 | |
| WO | 2013-047379 | A | | 4/2013 | |
| WO | 2020-054546 | A1 | | 3/2020 | |

* cited by examiner

METHOD FOR MANUFACTURING SECONDARY BATTERY

CROSS CITATION WITH RELATED APPLICATION(S)

The present application is a National Stage Application of International Application No. PCT/KR2021/012447, filed on Sep. 13, 2021, which claims priority to Korean Patent Application No. 10-2020-0117965 filed on Sep. 14, 2020, the disclosures of which are incorporated herein by reference in their entirety.

FIELD OF DISCLOSURE

The present disclosure relates to a method for manufacturing a secondary battery, including a novel activation step.

BACKGROUND

Recently, lithium-ion secondary batteries have been used widely as power sources of portable electronic instruments, such as notebook PCs, cellular phones, digital cameras, camcorders, or the like. In addition, since such lithium-ion secondary batteries have high energy density, they have been applied to transport means, such as electric vehicles.

In general, a lithium-ion secondary battery is obtained by stacking a positive electrode, a separator and a negative electrode to form a stack cell, accommodating the stack cell into a pouch and filling the pouch with an electrolyte. When the secondary battery is manufactured by stacking the electrodes and the separator as mentioned above, a gap may be generated between the separator and the electrode. When such a gap is small, improvement of the performance of a battery, such as capacity characteristics, life characteristics and safety, can be expected. Meanwhile, a battery using a liquid type electrolyte shows poor safety due to the volatility and ignitibility of the electrolyte. In addition, such a battery may cause the problem of electrolyte leakage to the outside of the battery. To solve such problems of the secondary battery, a gel polymer electrolyte (gelyte) has been used. Although such a gel polymer electrolyte has higher safety as compared to the liquid electrolyte, it shows significantly lower flowability as compared to the liquid electrolyte. Therefore, when a gap is generated between the electrode and the separator, the performance of the battery is degraded undesirably.

SUMMARY

The present disclosure is directed to providing a method for manufacturing a gel polymer electrolyte secondary battery using a gelyte as an electrolyte. The present disclosure is also directed to providing a method for manufacturing a secondary battery, including a novel battery activation step so that the gap between a separator and an electrode may be reduced and the binding of the separator with the electrode may be retained stably. It will be easily understood that the objects and advantages of the present disclosure may be realized by the means shown in the appended claims and combinations thereof.

According to the first embodiment of the present disclosure, there is provided a method for manufacturing a gel polymer electrolyte battery, including:

(S1) a pre-aging step which includes accommodating a stack cell in a battery housing, injecting an electrolyte precursor thereto, and gelling the electrolyte precursor to form a gel polymer electrolyte;

(S2) a first pressurization step of pressurizing the product of (S1);

(S3) a formation step of carrying out charge/discharge of the product of (S2); (S4) an aging step of allowing the product of (S3) to stand for a predetermined time; and (S5) a second pressurization step of pressurizing the product of (S4), wherein step (S5) is carried out under a pressure higher than that of step (S2).

According to the second embodiment of the present disclosure, there is provided the method for manufacturing a gel polymer electrolyte battery as defined in the first embodiment, wherein the first pressurization step is carried out at 3 $kgf/cm^2$ or less.

According to the third embodiment of the present disclosure, there is provided the method for manufacturing a gel polymer electrolyte battery as defined in the first or the second embodiment, wherein the electrolyte precursor includes an organic solvent, a lithium salt, a crosslinkable polymer and/or oligomer, and a crosslinking initiator.

According to the fourth embodiment of the present disclosure, there is provided the method for manufacturing a gel polymer electrolyte battery as defined in the third embodiment, wherein the crosslinkable polymer includes a polyvinylidene fluoride (PVDF)-based polymer containing a vinylidene fluoride unit and/or an acrylic polymer having a crosslinkable functional group.

According to the fifth embodiment of the present disclosure, there is provided the method for manufacturing a gel polymer electrolyte battery as defined in any one of the first to the fourth embodiments, wherein the step of gelling the electrolyte precursor is carried out at a temperature where crosslinking is accomplished.

According to the sixth embodiment of the present disclosure, there is provided the method for manufacturing a gel polymer electrolyte battery as defined in any one of the first to the fifth embodiments, wherein step (S2) is carried out for a time of 1 hour or less.

According to the seventh embodiment of the present disclosure, there is provided the method for manufacturing a gel polymer electrolyte battery as defined in any one of the first to the sixth embodiments, wherein step (S3) is carried out under the same pressure as that of step (S2), while not releasing the pressure applied to step (S2).

According to the eighth embodiment of the present disclosure, there is provided the method for manufacturing a gel polymer electrolyte battery as defined in any one of the first to the seventh embodiments, wherein step (S3) is carried out by charging to 30-100% of the battery capacity.

According to the ninth embodiment of the present disclosure, there is provided the method for manufacturing a gel polymer electrolyte battery as defined in any one of the first to the eighth embodiments, wherein step (S5) is carried out at a temperature equal to or higher than the temperature of step (S2).

According to the tenth embodiment of the present disclosure, there is provided the method for manufacturing a gel polymer electrolyte battery as defined in any one of the first to the ninth embodiments, wherein step (S5) is carried out at a temperature higher than the temperature of step (S2).

According to the eleventh embodiment of the present disclosure, there is provided the method for manufacturing a gel polymer electrolyte battery as defined in any one of the first to the tenth embodiments, wherein step (S5) is carried out at a temperature higher than the temperature of step (S2).

According to the twelfth embodiment of the present disclosure, there is provided the method for manufacturing a gel polymer electrolyte battery as defined in any one of the first to the eleventh embodiments, wherein a degassing step is further carried out after step (S5).

The gel polymer electrolyte battery obtained according to the present disclosure shows a small gap between a separator and an electrode and high binding force. In addition, the battery has a reduced thickness and improved shape stability and stiffness.

As a result, the battery shows increased initial capacity, reduced initial resistance, and improved characteristics, such as cycle characteristics, high-temperature safety, overcharge safety and penetration safety.

Further, the gel polymer electrolyte battery undergoes no change in physical properties, such as deterioration of an electrolyte, when it is subjected to a high temperature/pressurization step and accomplishes a desired effect within a relatively short processing time, and thus shows improved processing efficiency as compared to the manufacture of the conventional liquid electrolyte batteries.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing. Meanwhile, shapes, sizes, scales or proportions of some constitutional elements in the drawings may be exaggerated for the purpose of clearer description.

DETAILED DESCRIPTION

Figure 1:
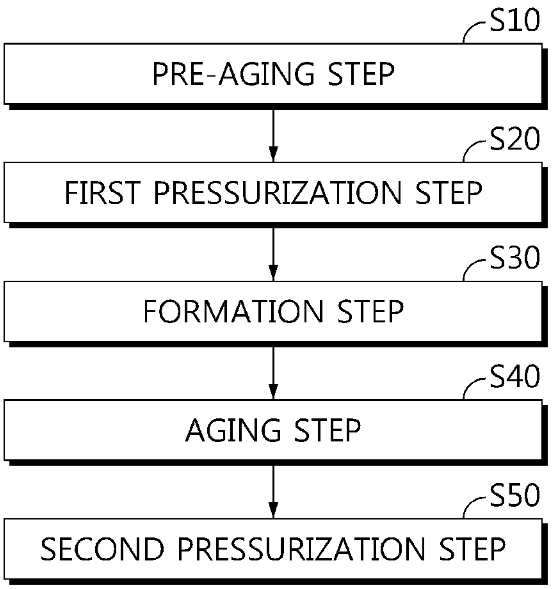
FIG. 1 is a flow chart illustrating the method for manufacturing a battery according to an embodiment of the present disclosure.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Throughout the specification, the expression 'a part includes an element' does not preclude the presence of any additional elements but means that the part may further include the other elements.

As used herein, the terms 'about', 'substantially', or the like, are used as meaning contiguous from or to the stated numerical value, when an acceptable preparation and material error unique to the stated meaning is suggested, and are used for the purpose of preventing an unconscientious invader from unduly using the stated disclosure including an accurate or absolute numerical value provided to help understanding of the present disclosure.

As used herein, the expression 'A and/or B' means 'A, B or both of them'.

Specific terms used in the following description are for illustrative purposes and are not limiting. Such terms as 'right', 'left', 'top surface' and 'bottom surface' show the directions in the drawings to which they are referred. Such terms as 'inwardly' and 'outwardly' show the direction toward the geometrical center of the corresponding apparatus, system and members thereof and the direction away from the same, respectively. 'Front', 'rear', 'top' and 'bottom' and related words and expressions show the positions and points in the drawings to which they are referred and should not be limiting. Such terms include the above-listed words, derivatives thereof and words having similar meanings.

The present disclosure relates to a method for manufacturing a secondary battery, particularly a method for manufacturing a secondary battery, including a novel activation step. As used herein, the term 'secondary battery' means a repeatedly rechargeable battery and has a concept covering a lithium-ion battery, nickel-cadmium battery, nickel metal hydride battery, or the like.

FIG. 1 is a flow chart illustrating the method for manufacturing a battery according to an embodiment of the present disclosure.

Referring to FIG. 1, the method for manufacturing a secondary battery according to an embodiment of the present disclosure includes an activation step including: (S1) a pre-aging step; (S2) a first pressurization step; (S3) a formation step: (S4) an aging step; and (S5) a second pressurization step. Herein, each of the first pressurization step and the second pressurization step may be carried out in a heated state independently. In addition, the second pressurization step may be carried out under a higher pressure as compared to the first pressurization step.

According to an embodiment of the present disclosure, the pre-aging step (S1) may be carried out by accommodating a stack cell in a battery housing, injecting an electrolyte precursor thereto, and allowing the resultant product to stand at room temperature for a predetermined time. The electrolyte precursor may include an organic solvent, a lithium salt, a crosslinkable polymer and/or oligomer, and a crosslinking initiator.

The pre-aging includes a first step carried out for impregnating the stack cell sufficiently with the electrolyte precursor, and a second step for gelling the electrolyte precursor to form a gel polymer electrolyte.

The first step may be carried out for a time sufficient to allow the electrolyte precursor to infiltrate and diffuse to the micropores of the electrode or separator. In addition, the first step is carried out before charging/discharging the battery, and is performed preferably at room temperature so that decomposition of the ingredients, such as the organic solvent, contained in the electrolyte precursor may be prevented.

According to an embodiment of the present disclosure, the electrolyte precursor means one that is gelled by heating in the second step as described below to form a gel polymer electrolyte. The electrolyte precursor is a salt having a structure of $A^+B^-$, wherein $A^+$ includes an alkali metal cation such as $Li^+$, $Na^+$, $K^+$ or a combination thereof, and $B^-$ includes an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or a combination thereof, the salt being dissolved or dissociated in an organic solvent. Particular examples of the organic solvent include propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone (γ-butyrolactone) and ester compounds, and any one selected from such organic solvents or a mixture of two or more of them may be used.

In addition, the electrolyte precursor is one that may be gelled by crosslinking or polymerization and includes a crosslinkable polymer and/or oligomer, and may further include a polymerization initiator for the purpose of crosslinking or polymerization thereof. According to an embodiment of the present disclosure, the crosslinkable polymer may include a polyvinylidene fluoride (PVDF)-based polymer containing a vinylidene fluoride unit and/or an acrylic polymer having a crosslinkable functional group. Non-limiting examples of the PVDF-based polymer may include polyvinylidene fluoride (PVDF), polyvinylidene fluoride-co-hexafluoropropylene (PVDF-HFP), polyvinylidene fluoride-co-tetrafluoroproethylene (PVDF-TFE), polyvinylidene fluoride-co-chlorotrifluoroethylene ethylene (PVDF-CTFE), polyvinylidene fluoride-co-trifluoroproethylene (PVDF-TrFE), or the like, and at least one of them may be used. According to an embodiment of the present disclosure, the polymerization initiator may include a thermal initiator, such as AIBN, or a peroxide initiator, such as benzoyl peroxide. The electrolyte precursor may be gelled through the crosslinking of the crosslinkable polymer, induced by the crosslinking initiator.

Meanwhile, according to the present disclosure, the second step may be carried out at a temperature sufficient to allow the initiator contained in the electrolyte precursor to initiate polymerization. For example, the temperature may range from 30° C. to 80° C. In the second step, the crosslinkable polymer and/or oligomer contained in the electrolyte precursor may be crosslinked or polymerized so that the inner part of the battery may be filled with a gel polymer electrolyte. Meanwhile, according to an embodiment of the present disclosure, before and/or after heating to the above-defined temperature, a room-temperature aging step may be further carried out, wherein the battery is allowed to stand at room temperature for a predetermined time.

Meanwhile, the pre-aging step may be carried out, after the electrolyte precursor is injected and the battery housing is sealed preliminarily. Such preliminary sealing refers to complete pre-sealing of the battery housing for carrying out a degassing step of discharging the gases in the battery, generated in the formation step as described hereinafter, or the like.

After completing the pre-aging step as mentioned above, the first pressurization step (S2) is carried out.

According to an embodiment of the present disclosure, the first pressurization step may be carried out under a pressure of 3 $kgf/cm^2$ or less. For example, the pressurization may be controlled to 1-3 $kgf/cm^2$. In addition, the first pressurization step may be carried out at a temperature of about 30-70° C. For example, the temperature may be controlled to 50° C. or higher. Preferably, the pressurization condition and temperature condition may be retained for 1 hour or less, particularly 30 minutes or less. According to the present disclosure, the first pressurization is carried out in order to fix the shape of the stack cell (for example, the shape of the stack cell is fixed to prevent bending, when the stack cell is planar), and to accelerate homogeneous diffusion of the electrolyte precursor into the battery. Thus, the first pressurization step is effective for increasing the shape stability of the battery and reducing the non-uniformity in the stack cell before carrying out a formation step. Therefore, it is possible to ensure uniform electrochemical characteristics, such as resistance and binding force, throughout the battery by the subsequent formation step.

After carrying out the first pressurization step as mentioned above, a formation step is carried out (S3). According to the present disclosure, the formation step means a step of activating the secondary battery by charging and discharging the secondary battery after the completion of the first pressurization step. According to the present disclosure, the formation step may be carried out continuously under the same pressure as that of step (S2), while not releasing the pressure applied to step (S2).

According to an embodiment of the present disclosure, in step (S3), the battery is charged to 30-100%, 50-100%, or 80-100% of the battery capacity, and discharged to 50-0% or 30-0% of the battery capacity. According to an embodiment of the present disclosure, the battery capacity is expressed by state-of-charge (SOC).

In the method for manufacturing a secondary battery according to the present disclosure, the problem of lithium metal plating or an increase in resistance caused thereby is reduced significantly, since the inner part of the stack cell is impregnated sufficiently with the electrolyte precursor before carrying out the formation step. Therefore, it is possible to carry out charge/discharge to the maximum SOC, 100%, in the formation step subsequent to the pre-aging step. According to an embodiment of the present disclosure, the battery may be charged in a constant-current (CC)/constant-voltage (CV) mode and discharged in a CC mode based on 0.1 C-rate. The charge/discharge cut-off voltage may be set in a range of 2.3-4.5 V. However, the charge/discharge conditions, such as the charge/discharge modes, cut-off voltage range and C-rate, are not limited particularly to the above-defined ranges, and any suitable range or condition may be set considering the electrode active materials, battery types, battery characteristics, or the like. Meanwhile, the formation step is carried out preferably at a temperature lower than that applied in the first pressurization step. For example, the formation step may be carried out at a temperature of lower than 60° C.

After the formation step, an aging step may be carried out (S4). The aging step may include a step of allowing the battery at a temperature of 30-70° C. to stand for a predetermined time. While the aging step is carried out, the electrolyte is distributed homogeneously in the battery, and the solid electrolyte interface (SEI) film formed by heat energy and electrochemical energy is further stabilized and is reformed with a uniform thickness without localization. Meanwhile, according to an embodiment of the present disclosure, a room-temperature aging step may be further carried out before and/or after heating to the above-defined temperature.

Then, the second pressurization step is carried out (S5).

According to the present disclosure, the pressurization condition in the second pressurization step is higher than the pressurization condition in the first pressurization step. For example, the pressurization condition in the second pressurization step may be higher than 3 $kgf/cm^2$. Meanwhile, the temperature condition in the second pressurization step may be equal to or higher than that of the first pressurization. According to an embodiment of the present disclosure, since the second pressurization step is carried out under a relatively severe condition as compared to the first pressurization step, the temperature and pressure may be maintained for a time equal to or smaller than the processing time of the first pressurization step. However, the time is controlled depending on the temperature condition of the second pressurization. For example, the second pressurization step may be carried out for a time controlled suitably in a range of 1-90 minutes. According to the present disclosure, it is possible to enhance the interfacial binding force and stiffness of the battery by allowing the separator to be in close contact with the electrode through the second pressurization step. Meanwhile, a degassing step of discharging the gases generated in the battery before or after carrying out the second pressurization step may be further carried out, and the second pressurization may accelerate discharge of the gases.

Meanwhile, as described above, a degassing step may be carried out before or after carrying out the second pressurization step. To perform the degassing step, the pre-sealing of the battery housing may be released to open the battery. Then, the battery housing is sealed after the degassing step to obtain a battery.

According to an embodiment of the present disclosure, the stack cell may include a negative electrode, a positive electrode and a separator interposed between the negative electrode and the positive electrode.

The separator is interposed between the positive electrode and the negative electrode, and an insulating thin film having high ion permeability and mechanical strength is used as the separator. The separator generally has a pore diameter of 0.01-10 μm and a thickness of 5-300 μm. For example, the separator may include insulating porous substrates, such as polymer sheets or non-woven webs, including chemically resistant and hydrophobic olefinic polymers, such as polypropylene, glass fibers or polyethylene, used conventionally in the field of secondary batteries. Meanwhile, the separator may further include an inorganic coating layer formed on the surface of the porous substrate and including inorganic particles in order to increase the heat resistance and stability of the separator.

The inorganic coating layer includes inorganic particles and a binder resin, and may have a porous structure derived from the interstitial volumes among the inorganic particles.

According to an embodiment of the present disclosure, there is no particular limitation in the inorganic particles, as long as they are electrochemically stable and cause no oxidation and/or reduction in the range of operating voltage of an applicable electrochemical device. For example, the inorganic particles may include any one of $SrTiO_3$, $SnO_2$, $CeO_2$, MgO, NiO, CaO, ZnO, $ZrO_2$, $SiO_2$, $Y_2O_3$, $Al_2O_3$, AlOOH, $Al(OH)_3$, SiC and $TiO_2$, or two or more of them.

Meanwhile, particular examples of the binder resin include, but are not limited to: fluorinated resins, such as PVDF and PVDF-HFP, polymethyl methacrylate, polybutyl acrylate, polybutyl methacrylate, polyacrylonitrile, polyvinyl pyrrolidone, polyethylene oxide, polyarylate, cellulose acetate, cellulose acetate butyrate, cellulose acetate propionate, cyanoethylpullulan, cyanoethylpolyvinyl alchol, cyanoethyl cellulose, cyanoethyl sucrose, pullulan, and carboxymethyl cellulose.

According to the present disclosure, the positive electrode includes a positive electrode current collector and a positive electrode active material layer formed on at least one surface of the current collector and containing a positive electrode active material, a conductive material and a binder resin. The positive electrode active material may include any one selected from: layered compounds, such as lithium manganese composite oxide ($LiMn_2O_4$, $LiMnO_2$, etc.), lithium cobalt oxide ($LiCoO_2$) and lithium nickel oxide ($LiNiO_2$), or those compounds substituted with one or more transition metals; lithium manganese oxides such as those represented by the chemical formula of $Li_xMn_yNi_zCO_{(1-y-z)}O_2$ (wherein x is 0.5-2 and x+y+z=1), chemical formula of $Li_{1+x}Mn_{2-x}O_4$ (wherein x is 0-0.33), $LiMnO_3$, $LiMn_2O_3$ and $LiMnO_2$; lithium copper oxide ($Li_2CuO_2$); vanadium oxides such as $LiV_3O_8$, $LiV_3O_4$, $V_2O_5$ or $Cu_2V_2O_7$; Ni-site type lithium nickel oxides represented by the chemical formula of $LiNi_{1-x}MxO_2$ (wherein M is Co, Mn, Al, Cu, Fe, Mg, B or Ga, and x is 0.01-0.3); lithium manganese composite oxides represented by the chemical formula of $Li_aNi_xCo_yMn_2O_2$ (0<a<1.5, 0< [x, y, z]<1, x+y+z=1), chemical formula of $LiMn_{2-x}M_xO_2$ (wherein M is Co, Ni, Fe, Cr, Zn or Ta, and x is 0.01-0.1) or $Li_2Mn_3MO_8$ (wherein M is Fe, Co, Ni, Cu or Zn); $LiMn_2O_4$ in which Li is partially substituted with an alkaline earth metal ion; disulfide compounds; and $Fe_2(MoO_4)_3$; or a mixture of two or more of them.

According to the present disclosure, the negative electrode includes a negative electrode current collector, and a negative electrode active material layer formed on at least one surface of the current collector and containing a negative electrode active material, a conductive material and a binder resin. The negative electrode may include, as a negative electrode active material, any one selected from: lithium metal oxide; carbon such as non-graphitizable carbon or graphite-based carbon; metal composite oxides, such as $Li_xFe_2O_3$ (0≤x≤1), $Li_xWO_2$ (0≤x≤1), $Sn_xMe_{1-x}Me'_yO_z$ (Me:Mn, Fe, Pb, Ge; Me':Al, B, P, Si, elements of Group 1, 2 or 3 in the Periodic Table, halogen; 0<x≤1; 1≤y≤3; 1≤z≤8); lithium metal; lithium alloy; silicon-based alloy; tin-based alloy; metal oxides, such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$ and $Bi_2O_5$; conductive polymers, such as polyacetylene; Li—Co—Ni type materials; and titanium oxide; or a mixture of two or more of them.

According to an embodiment of the present disclosure, the conductive material may be any one selected from the group consisting of graphite, carbon black, carbon fibers or metal fibers, metal powder, conductive whiskers, conductive metal oxides, activated carbon and polyphenylene derivatives, or a mixture of two or more of such conductive materials. More particularly, the conductive material may be any one selected from natural graphite, artificial graphite, Super-P, acetylene black, Ketjen black, channel black, furnace black, lamp black, thermal black, denka black, aluminum powder, nickel powder, zinc oxide, potassium titanate and titanium dioxide, or a mixture of two or more such conductive materials.

The current collector is not particularly limited, as long as it causes no chemical change in the corresponding battery and has high conductivity. Particular examples of the current collector may include stainless steel, copper, aluminum, nickel, titanium, baked carbon, aluminum or stainless steel surface-treated with carbon, nickel, titanium or silver, or the like.

The binder resin may be a polymer used currently for an electrode in the art. Non-limiting examples of the binder resin include, but are not limited to: polyvinylidene fluoride-co-hexafluoropropylene, polyvinylidene fluoride-co-trichloroethylene, polymethyl methacrylate, polyethylhexyl acrylate, polybutyl acrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethylpolyvinyl alchol, cyanoethyl cellulose, cyanoethyl sucrose, pullulan, and carboxymethyl cellulose.

In addition, the present disclosure provides a battery module which includes a battery including the electrode assembly as a unit cell, a battery pack including the battery module, and a device including the battery pack as an electric power source. Particular examples of the device include, but are not limited to: power tools driven by the power of an electric motor; electric cars, including electric vehicles (EV), hybrid electric vehicles (HEV), plug-in hybrid electric vehicles (PHEV), or the like; electric two-wheeled vehicles, including E-bikes and E-scooters; electric golf carts; electric power storage systems; or the like.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Manufacture Example: Manufacture of Stack Cell

Manufacture of Positive Electrode

First, $LiNi_{1/3}Mn_{1/3}Co_{1/3}O_4$, a conductive material (carbon black), and a binder (SBR/CMC, weight ratio 70:30) were introduced to deionized water at a weight ratio of 90:5:5, followed by mixing, to prepare a positive electrode mixture. Then, the resultant positive electrode mixture was coated on aluminum foil (thickness of 20 μm) as a positive electrode current collector to a thickness of 60 μm, followed by drying, to obtain a positive electrode.

Manufacture of Negative Electrode

Lithium metal foil (thickness 160 μm) was used as a negative electrode. A separator (separator made of polyethylene, thickness 20 μm) was interposed between the negative electrode and the positive electrode to obtain a stack-type stack cell.

Manufacture of Separator $Al_2O_3$ and PVDF-HFP were introduced to acetone to obtain slurry for forming an inorganic coating layer. The mixing ratio of the inorganic particles to the binder resin in the slurry was 80:20 on the weight basis. In addition, each slurry had a solid content of about 18 wt %, except acetone. The slurry was applied to a separator (polyethylene, porosity 45%, thickness 9 μm) at a loading amount of 15 $g/m^2$ based on the area of the separator and dried under a humidified condition of a relative humidity of 45%. Then, the dried product was cut into a size of 60 mm (length)×25 mm (width) to obtain a separator.

Preparation of Electrolyte Precursor

Ethylene carbonate was mixed with ethyl methyl carbonate at a volume ratio of 3:7, and a lithium salt was introduced thereto to a concentration of 1.2 M. The lithium salt includes $LiPF_6$ mixed with LiFSI at a ratio of 0.5 mol:0.7 mol. Then, 5 wt % of PVDF-HFP and 0.02 wt % of AIBN as a polymerization initiator were introduced thereto to prepare an electrolyte precursor.

Manufacture of Battery

The positive electrode, the separator and the negative electrode obtained as described above were stacked successively, and lamination was carried out to obtain a stack cell. The stack cell was accommodated in a pouch-type battery housing, the electrolyte precursor was injected thereto, and pre-sealing was carried out.

EXAMPLES

The battery obtained from the Manufacture Example was subjected to an activation step as follows to finish the manufacture of the battery. First, the battery was allowed to stand at room temperature for about 2 days and at 70° C. for 3 hours to perform a pre-aging step of gelling the electrolyte precursor into a gel polymer electrolyte. Next, a first pressurization step was carried out. The first pressurization condition of each Example is shown in the following Table 1. Then, formation was carried out under the same pressure condition at 50° C. The formation was performed by charging at 0.1 C in a constant-current (CC)/constant-voltage (CV) mode and discharging at 0.1 C in a CC mode, wherein the battery was charged to 30% of SOC. After that, the battery was subjected to an aging step. The aging step was maintained at 60° C. for 1 day. Then, a second pressurization step was carried out. The second pressurization condition of each Example is shown in the following Table 1. After that, the pre-sealing was released to carry out a degassing step, and the battery housing was sealed to finish the manufacture of a secondary battery.

TABLE 1

| Example No. | | First pressurization | Second pressurization | Remarks |
|---|---|---|---|---|
| Example 1 | Temperature (° C.) | 60 | 80 | |
| | Time (min) | 10 | 10 | |
| | Pressure (kfgcm$^3$kgf/cm$^2$) | 3 | 5 | |
| Example 2 | Temperature (° C.) | 60 | 60 | |
| | Time (min) | 10 | 60 | |
| | Pressure (kgf/cm$^2$) | 3 | 5 | |
| Example 3 | Temperature (° C.) | 60 | 60 | |
| | Time (min) | 10 | 10 | |
| | Pressure (kgf/cm$^2$) | 3 | 5 | |
| Example 4 | Temperature (° C.) | 80 | 80 | Same temperature |
| | Time (min) | 10 | 5 | Higher pressure in |
| | Pressure (kgf/cm$^2$) | 3 | 5 | second pressurization step |
| Example 5 | Temperature (° C.) | 80 | 60 | Lower temperature |
| | Time (min) | 5 | 10 | in second |
| | Pressure (kgf/cm$^2$) | 3 | 5 | pressurization step |
| Example 6 | Temperature (° C.) | 70 | 80 | Higher temperature |
| | Time (min) | 10 | 5 | and pressure in |
| | Pressure (kgf/cm$^2$) | 3 | 5 | second pressurization step |

TABLE 1-continued

| Example No. | | First pressurization | Second pressurization | Remarks |
| --- | --- | --- | --- | --- |
| Example 7 | Temperature (° C.) | 70 | 80 | Higher temperature |
| | Time (min) | 5 | 5 | and pressure in |
| | Pressure (kgf/cm$^2$) | 3 | 5 | second pressurization step |

Figure 2:
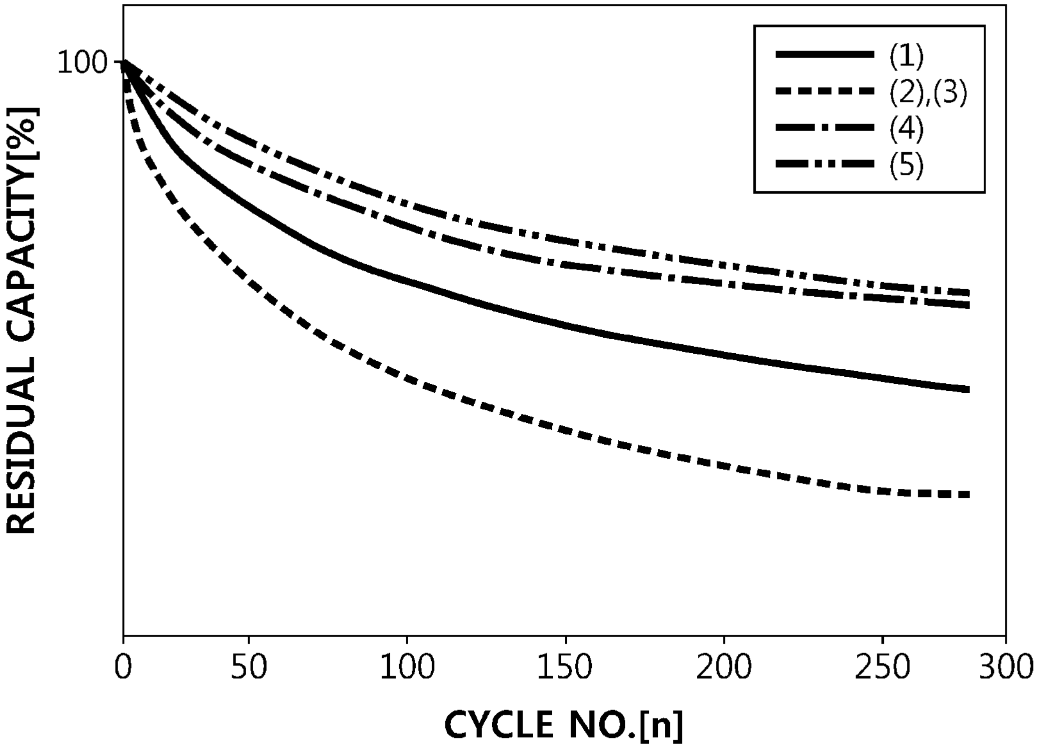
FIG. 2 is a graph illustrating the life characteristics of the batteries according to Examples 3-7.

Each of the batteries according to Examples 3-7 was determined in terms of life characteristics. Each lithium battery was charged in a CC/CV mode at 0.33 C to a current of 0.05 C at 3.6 V, and discharged to a voltage of 2.5 V at the same current. Then, 300 charge/discharge cycles were repeated in the same current/voltage range. FIG. 2 illustrates the cycle characteristics according to this charge/discharge test. Meanwhile, the residual capacity is calculated according to the following Mathematical Formula 1. FIG. 2 shows the test results, wherein Examples using a higher pressure and higher temperature in the second pressurization step provide higher cycle characteristics as compared to the other Examples. In FIG. 2, (1) represents Example 3, (2) and (3) represent Examples 4 and 5, respectively, (4) represents Example 6, and (5) represents Example 7. Graphs (2) and (3) show similar results and are overlapped with each other.

[Mathematical Formula 1]

$$\text{Residual capacity (\%)} = \text{Discharge capacity at the } 300^{th} \text{ cycle/} \text{Discharge capacity at the } 2^{nd} \text{ cycle}] \times 100$$

Comparative Examples

Manufacture of Battery: Comparative Examples 1-5

The positive electrode, the separator and the negative electrode obtained from the Manufacture Example were stacked successively, and lamination was carried out to obtain a stack cell. The stack cell was accommodated in a pouch-type battery housing, an electrolyte was injected thereto, and pre-sealing was carried out. The electrolyte was prepared by mixing ethylene carbonate with ethyl methyl carbonate at a volume ratio of 3:7, and introducing a lithium salt thereto to a concentration of 1.2 M. The lithium salt includes $LiPF_6$ mixed with LiFSI at a ratio of 0.5 mol:0.7 mol.

Manufacture of Battery: Comparative Examples 6-9

First, ethylene carbonate was mixed with ethyl methyl carbonate at a volume ratio of 3:7, and a lithium salt was introduced thereto to a concentration of 1.2 M. The lithium salt includes $LiPF_6$ mixed with LiFSI at a ratio of 0.5 mol:0.7 mol. Then, 5 wt % of PVDF-HFP and 0.02 wt % of AIBN as a polymerization initiator were introduced thereto to prepare an electrolyte precursor. The positive electrode, the separator and the negative electrode obtained from the Manufacture Example were stacked successively, and lamination was carried out to obtain a stack cell. The stack cell was accommodated in a pouch-type battery housing, the electrolyte precursor was injected thereto, and pre-sealing was carried out.

Manufacture of Battery: Comparative Examples 10-13

Manufacture of Positive Electrode

First, $LiNi_{1/3}Mn_{1/3}Co_{1/3}O_4$, a conductive material (carbon black), and a binder (SBR/CMC, weight ratio 70:30) were introduced to deionized water at a weight ratio of 90:5:5, followed by mixing, to prepare a positive electrode mixture. Then, the resultant positive electrode mixture was coated on aluminum foil (thickness of 20 μm) as a positive electrode current collector to a thickness of 60 μm, followed by drying, to obtain a positive electrode.

Manufacture of Negative Electrode

Lithium metal foil (thickness 160 μm) was used as a negative electrode. A separator (separator made of polyethylene, thickness 20 μm) was interposed between the negative electrode and the positive electrode to obtain a stack-type stack cell.

Manufacture of Separator $Al_2O_3$ and PVDF-HFP were introduced to acetone to obtain slurry for forming an inorganic coating layer. The mixing ratio of the inorganic particles to the binder resin in the slurry was 80:20 on the weight basis. In addition, each slurry had a solid content of about 18 wt %, except acetone. The slurry was applied to a separator (polyethylene, porosity 45%, thickness 9 μm) at a loading amount of 15 g/m$^2$ based on the area of the separator and dried under a humidified condition of a relative humidity of 45%. Then, the dried product was cut into a size of 60 mm (length)×25 mm (width) to obtain a separator.

Preparation of Electrolyte Precursor Ethylene carbonate was mixed with ethyl methyl carbonate at a volume ratio of 3:7, and a lithium salt was introduced thereto to a concentration of 1.2 M. The lithium salt includes $LiPF_6$ mixed with LiFSI at a ratio of 0.5 mol:0.7 mol. Then, 5 wt % of PVDF-HFP and 0.02 wt % of AIBN as a polymerization initiator were introduced thereto to prepare an electrolyte precursor.

Manufacture of Battery

The positive electrode, the separator and the negative electrode obtained as described above were stacked successively, and lamination was carried out to obtain a stack cell. The stack cell was accommodated in a pouch-type battery housing, the electrolyte precursor was injected thereto, and pre-sealing was carried out.

Activation Step

Comparative Examples 1 and 9 (Comparative Example 1 is Liquid Electrolyte Battery, and Comparative Example 9 is Gel Polymer Electrolyte Battery, No Pressurization Step is Carried Out)

An aging step was carried out at 60° C. for 1 day, and formation was carried out under 3 kgf/cm$^2$ at 50° C. The formation was performed by charging at 0.1 C in a CC/CV mode and discharging at 0.1 C in a CC mode, wherein the battery was charged to 30% of SOC. Then, pre-sealing was released to perform a degassing step, and the battery housing was sealed to finish the manufacture of a secondary battery.

Comparative Examples 2-5 (Liquid Electrolyte Battery, Second Pressurization Step Applied)

The battery obtained from the Manufacture Example was subjected to an activation step as follows to finish the manufacture of the battery. First, the battery was allowed to stand at room temperature for about 2 days to perform a pre-aging step. Next, the battery was allowed to stand at 60° C. under a pressure of 3 kgf/cm$^2$, and formation was carried out under the same pressure condition at 50° C. The formation was performed by charging at 0.1 C in a constant-current (CC)/constant-voltage (CV) mode and discharging at 0.1 C in a CC mode, wherein the battery was charged to 30% of SOC. After that, the battery was subjected to an aging step. The aging step was maintained at 60° C. for 1 day. Then, a second pressurization step was carried out. The second pressurization condition of each Example is shown in the following Table 2. After that, the pre-sealing was released to carry out a degassing step, and the battery housing was sealed to finish the manufacture of a secondary battery.

Comparative Examples 6-9 (Gelyte, Second Pressurization Step Applied)

The battery obtained from the Manufacture Example was subjected to an activation step as follows to finish the manufacture of the battery. First, the battery was allowed to stand at room temperature for about 2 days and at 60° C. for 3 hours to perform a pre-aging step of gelling the electrolyte precursor into a gel polymer electrolyte. Next, formation was performed with no first pressurization step. The formation was performed by charging at 0.1 C in a constant-current (CC)/constant-voltage (CV) mode and discharging at 0.1 C in a CC mode, wherein the battery was charged to 30% of SOC. After that, the battery was subjected to an aging step. The aging step was maintained at 60° C. for 1 day. Then, a second pressurization step was carried out. The second pressurization condition of each Example is shown in the following Table 3. After that, the pre-sealing was released to carry out a degassing step, and the battery housing was sealed to finish the manufacture of a secondary battery.

Comparative Examples 10-13 (Gelyte, Second Pressurization Step Applied)

The battery obtained from the Manufacture Example was subjected to an activation step as follows to finish the manufacture of the battery. First, the battery was allowed to stand at room temperature for about 2 days and at 60° C. for 3 hours to perform a pre-aging step of gelling the electrolyte precursor into a gel polymer electrolyte. Next, the battery was allowed to stand at 60° C. for 3 hours under a pressure of 3 kgf, and formation was carried out under the same pressure condition at 50° C. The formation was performed by charging at 0.1 C in a constant-current (CC)/constant-voltage (CV) mode and discharging at 0.1 C in a CC mode, wherein the battery was charged to 30% of SOC. After that, the battery was subjected to an aging step. The aging step was maintained at 60° C. for 1 day. Then, a second pressurization step was carried out. The second pressurization condition of each Example is shown in the following Table 4. After that, the pre-sealing was released to carry out a degassing step, and the battery housing was sealed to finish the manufacture of a secondary battery.

TABLE 2

(Liquid electrolyte battery, First pressurization condition: Battery is allowed to stand at 60° C. under pressure of 3 kgf for 10 minutes)

| | | First pressurization step | Second pressurization step | Remarks |
|---|---|---|---|---|
| Comp. Ex. 2 | Temperature (° C.) | 60 | 80 | Liquid electrolyte used |
| | Time (min) | 10 | 10 | |
| | Pressure (kgf/cm$^2$) | 3 | 5 | |
| Comp. Ex. 3 | Temperature (° C.) | 60 | 80 | Liquid electrolyte used |
| | Time (min) | 10 | 60 | |
| | Pressure (kgf/cm$^2$) | 3 | 5 | |
| Comp. Ex. 4 | Temperature (° C.) | 60 | 80 | Liquid electrolyte used |
| | Time (min) | 10 | 60 | |
| | Pressure (kgf/cm$^2$) | 3 | 3 | |
| Comp. Ex. 5 | Temperature (° C.) | 60 | 60 | Liquid electrolyte used |
| | Time (min) | 10 | 60 | |
| | Pressure (kgf/cm$^2$) | 3 | 3 | |

TABLE 3

| | | First pressurization step | Second pressurization step | Remarks |
|---|---|---|---|---|
| Comp. Ex. 6 | Temperature (° C.) | — | 60 | First pressurization step was not used |
| | Time (min) | — | 60 | |
| | Pressure (kgf/cm$^2$) | — | 5 | |
| Comp. Ex. 7 | Temperature (° C.) | — | 80 | First pressurization step was not used |
| | Time (min) | — | 60 | |
| | Pressure (kgf/cm$^2$) | — | 5 | |
| Comp. Ex. 8 | Temperature (° C.) | — | 80 | First pressurization step was not used |
| | Time (min) | — | 10 | |
| | Pressure (kgf/cm$^2$) | — | 5 | |

TABLE 4

| | | First pressurization step | Second pressurization step | Remarks |
|---|---|---|---|---|
| Comp. Ex. 10 | Temperature (° C.) | 60 | 80 | Same pressure |
| | Time (min) | 10 | 60 | |
| | Pressure (kgf/cm$^2$) | 3 | 3 | |
| Comp. Ex. 11 | Temperature (° C.) | 60 | 60 | Same pressure |
| | Time (min) | 10 | 60 | |
| | Pressure (kgf/cm$^2$) | 3 | 3 | |
| Comp. Ex. 12 | Temperature (° C.) | 60 | 80 | Lower pressure in second pressurization step |
| | Time (min) | 10 | 60 | |
| | Pressure (kgf/cm$^2$) | 3 | 1 | |
| Comp. Ex. 13 | Temperature (° C.) | 60 | 60 | Lower pressure in second pressurization step |
| | Time (min) | 10 | 60 | |
| | Pressure (kgf/cm$^2$) | 3 | 1 | |

Evaluation of Physical Properties

Evaluation of Resistance Characteristics

The battery was charged/discharged in a state of SOC 100% from SOC 100 to SOC 0 at an interval of SOC 10 with a pulse of 2.5 C, and the momentary resistance was determined by using a charger.

Evaluation of Stiffness

A stiffness jig was coupled with a UTM instrument. The jig had an upper plate/lower plate diameter of 5 mm, and the span size of the lower plate was 16 times of the thickness of a specimen. Then, a three-point bending rupture test was carried out. The working load applied to the specimen was 30 gf, and the speed was set to 5 mm/min. The actual test speed was 10 mm/min, and the compressed length was at most 2 mm.

Evaluation of Safety (Nail Penetration Test)

A nail having a thickness of 3 mm was allowed to penetrate completely through a battery specimen at a speed of 80 mm/sec. After observing the battery for about 1 hour after penetration, the battery was evaluated on the pass (no explosion)/fail (explosion) basis depending on whether it causes explosion or not.

TABLE 5

| | Resistance (%) | Stiffness (%) | Safety test (Pass/Total) |
|---|---|---|---|
| Example 1 | 104.6 | 150.4 | 3/3 |
| Example 2 | 108.3 | 138.1 | 3/3 |

TABLE 6

| | Resistance (%) | Stiffness (%) | Safety test (Pass/Total) |
|---|---|---|---|
| Comp. Ex. 1 | 100 | 100.0 | 0/3 |
| Comp. Ex. 2 | 98.3 | 110.0 | 0/3 |
| Comp. Ex. 3 | 99.5 | 115.8 | 0/3 |
| Comp. Ex. 4 | 99.6 | 113.5 | 0/3 |
| Comp. Ex. 5 | 97.8 | 112.6 | 0/3 |
| Comp. Ex. 6 | 115.1 | 109.8 | 0/3 |
| Comp. Ex. 7 | 113.6 | 112.8 | 0/3 |
| Comp. Ex. 8 | 112.4 | 107.5 | 0/3 |
| Comp. Ex. 9 | 113.6 | 105.3 | 1/3 |
| Comp. Ex. 10 | 107.8 | 118.2 | 1/3 |
| Comp. Ex. 11 | 108.1 | 116.3 | 1/3 |
| Comp. Ex. 12 | 110.3 | 106.3 | 0/3 |
| Comp. Ex. 13 | 109.8 | 104.4 | 0/3 |

As can be seen from Tables 5 and 6, the batteries of Examples 1 and 2 obtained by the method according to the present disclosure show higher stiffness and safety as compared to the batteries according to Comparative Examples. In addition, it can be seen that the batteries of Examples 1 and 2 obtained by the method according to the present disclosure show better resistance characteristics as compared to the batteries (Comparative Examples 6-13) using a solid electrolyte material among the batteries according to all Comparative Examples.

What is claimed is:

1. A method for manufacturing a gel polymer electrolyte battery, the method comprising:

(S1) a pre-aging step which includes accommodating a stack cell in a battery housing, injecting an electrolyte precursor thereto, and gelling the electrolyte precursor to form a gel polymer electrolyte;

(S2) a first pressurization step of pressurizing the product of step (S1);

(S3) a formation step of carrying out charge/discharge of the product of step (S2);

(S4) an aging step of allowing the product of step (S3) to stand for a predetermined time; and (S5) a second pressurization step of pressurizing the product of (S4), wherein step (S5) is carried out under a pressure higher than that of step (S2), and wherein the electrolyte precursor comprises an organic solvent, a lithium salt, a crosslinkable polymer and/or oligomer, and a crosslinking initiator.

2. The method according to claim 1, wherein the first pressurization step is carried out at 3 $kgf/cm^2$ or less.

3. The method according to claim 1, wherein the crosslinkable polymer comprises a polyvinylidene fluoride (PVDF)-based polymer containing a vinylidene fluoride unit; and/or an acrylic polymer having a crosslinkable functional group.

4. The method according to claim 1, wherein the step of gelling the electrolyte precursor is carried out at a temperature at which crosslinking of the crosslinkable polymer and/or oligomer is accomplished.

5. The method according to claim 1, wherein step (S2) is carried out for a time of 1 hour or less.

6. The method according to claim 1, wherein step (S3) is carried out under the same pressure as that of step (S2), while not releasing the pressure applied in step (S2).

7. The method according to claim 1, wherein step (S3) is carried out by charging to 30-100% capacity of the gel polymer electrolyte battery.

8. The method according to claim 1, wherein step (S5) is carried out at a temperature equal to or higher than that of step (S2).

9. The method according to claim 1, wherein step (S5) is carried out at a temperature higher than that of step (S2).

10. The method according to claim 1, wherein step (S2) is carried out at a temperature of 30-70° C.

11. The method according to claim 1, further comprising a degassing step carried out after step (S5).

* * * * *